United States Patent
Schmidt

(10) Patent No.: US 12,417,554 B2
(45) Date of Patent: Sep. 16, 2025

(54) SPLIT RUNLENGTH ENCODING COMPRESSION AND DECOMPRESSION OF MULTI-PLANAR IMAGE DATA

(71) Applicant: KYOCERA Document Solutions, Inc., Osaka (JP)

(72) Inventor: Kenneth Allen Schmidt, Redondo Beach, CA (US)

(73) Assignee: KYOCERA Document Solutions, Inc., Osaka (JP)

( * ) Notice: Subject to any disclaimer, the term of this patent is extended or adjusted under 35 U.S.C. 154(b) by 344 days.

(21) Appl. No.: 18/295,689

(22) Filed: Apr. 4, 2023

(65) Prior Publication Data

US 2024/0338855 A1 Oct. 10, 2024

(51) Int. Cl.
*G06T 9/00* (2006.01)
(52) U.S. Cl.
CPC .................................. *G06T 9/00* (2013.01)
(58) Field of Classification Search
CPC .......................................................... G06T 9/00

USPC ........................................................ 382/244
See application file for complete search history.

(56) References Cited

U.S. PATENT DOCUMENTS

| 6,919,825 | B2 | 7/2005 | Su et al. |
| 9,710,204 | B1* | 7/2017 | Nakahara ............ G06K 15/1822 |
| 2008/0107174 | A1* | 5/2008 | Roman ................ H04N 19/115 |
| | | | 375/E7.134 |

* cited by examiner

*Primary Examiner* — Kenny A Cese
(74) *Attorney, Agent, or Firm* — Carnelian Law, LLC

(57) ABSTRACT

Devices, such as printers, for rendering compressed digital images, include a deserializer and multiple planar SRLE decoders each configured to transform an applied code from a serial input stream into one or more planar pixel values. The deserializer maintains a cursor position for each of the planar SRLE decoders and increments the cursor position of a corresponding one of the planar SRLE decoders in response to dequeuing a code of the corresponding planar SRLE decoder. The increment is an amount equal to a count of planar pixel values represented by the code. The planar pixel values output from the SRLE decoders are combined into a digital image rendering.

20 Claims, 9 Drawing Sheets

SPLIT RUNLENGTH ENCODING COMPRESSION AND DECOMPRESSION OF MULTI-PLANAR IMAGE DATA

BACKGROUND

Conventional split runlength encoding (SRLE) is an image compression mechanism described for example in U.S. Pat. No. 6,919,825B2 and Japanese Patent No. JP4906506B2. SRLE is a lossless compression mechanism for image data, utilized for example in high-end printers and multi-function office devices.

SRLE compresses a single stream of planar pixel data (e.g., the pixel settings/bits in each color plane or other depth plane of a multi-plane digital image format). A single stream of pixels is input, and a single stream of compression codes is output. For an image composed of multiple planes, each color plane is compressed independently of the others. For example, if an image is composed of three color planes, cyan (C), magenta (M), and yellow (Y), SRLE mechanisms independently compress each plane, as depicted below. The output streams are independently generated from one another and do not share codes.

| | |
|---|---|
| C | Pixel Stream → SRLE Encoder → SRLE Stream of Encoded C pixels |
| M | Pixel Stream → SRLE Encoder → SRLE Stream of Encoded M pixels |
| Y | Pixel Stream → SRLE Encoder → SRLE Stream of Encoded Y pixels |

Multi-planar image data is generally organized in one of two formats: planar and chunky. SRLE is suitable to compress only planar formats. However, a Page Description Language (PDL) file sent to a printer for rendering may comprise image data in one or a mixture of the planar and chunky formats. For example, PDL formats such as PostScript or PDF support JPEG-compressed images, and JPEG is inherently chunky.

| | | |
|---|---|---|
| | Stream 1: | $C_1, C_2, C_3, \ldots, C_n$ |
| Planar | Stream 2: | $M_1, M_2, M_3, \ldots, M_n$ |
| | Stream 3: | $Y_1, Y_2, Y_3, \ldots, Y_n$ |
| Chunky | Single Stream: | $C_1, M_1, Y_1; C_2, M_2, Y_2; C_3, M_3, Y_3; \ldots C_n, M_n, Y_n$ |

Processing chunky images in a PDL stream using SRLE may require deserializing a N-way chunky stream into N planar streams, which in turn may require memory-to-memory copies of uncompressed data, which is resource-intensive and time consuming. (A common value of N in practice is 7). The SRLE encoder may then need to be executed multiple times (either serially, or as multiple threads executing in parallel) to produce planar compressed streams.

Planar SRLE places computing resource burdens on a rendering system, such as:

1. Memory consumption. It is common practice to align memory buffers to certain boundaries (like cache line boundaries) to enhance performance and simplify hardware logic, but alignment can require padding between buffers. Planar SRLE inherently writes to multiple buffers, and each buffer may require padding, thereby consuming additional memory.
2. Direct memory access (DMA) devices. Reading multiple streams of data by an application-specific integrated circuit (ASIC) typically requires individual DMA devices. Therefore for example an SRLE system that processes images with seven planes may require an ASIC with (at least) seven DMA devices.
3. Bandwidth consumption. Reading multiple streams of data by an ASIC from memory (e.g., DRAM) generally consumes more system bandwidth than reading the same amount of data in a single stream. Each request to write and (later) read a compressed buffer consumes ASIC resources, like buffers in the ASIC's bus network and its DRAM scheduler and controller module(s), and in DRAM devices, may require additional closing and opening of banks or rows to access different locations in memory.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
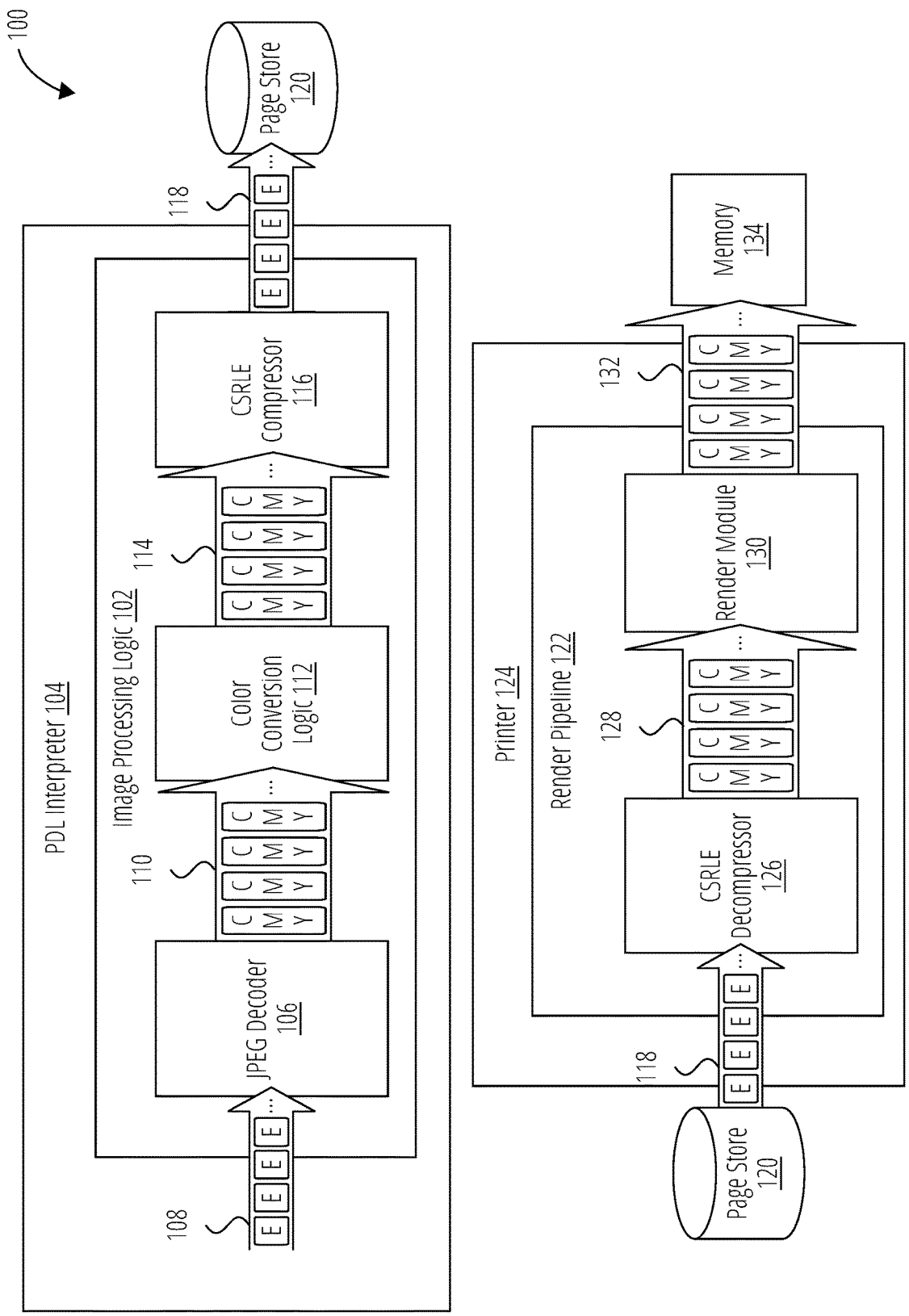
FIG. 1 depicts printing system 100 in accordance with one embodiment.

A conventional SRLE algorithm utilizes a variety of different encoding methods to compress runs of pixels whose values exactly match—or nearly match—one another. The algorithm is designed to take advantage of inherent properties of types of content that compose a print image, including (1) text and vector (line drawing) content, which comprise long runs of pixels with the same value, and (2) low-resolution raster data (photographic and scanned images) and gradient shadings content, which comprise short runs of replicated or slowly changing pixel values. Herein, the term "compressor" is utilized to indicate a component that reduces the memory storage requirements of an input data stream or streams while encoding (transforming) the stream or streams. Internally, a compressor may utilize multiple encoders for this purpose. The term "decompressor" is utilized to indicate a component that increases the memory storage requirements of an input data stream or streams while decoding (reversing a transformation of) the stream or streams. Internally, a decompressor may utilize multiple decoders for this purpose.

SRLE utilizes a variety of methods to encode runs of pixels. These encoding schemes are named LITERAL, NEAR SINGLE, NEAR REPEAT, and MATCH. The sizes of the generated codes vary in length, and a compressed stream may be generated using a variety and mix of encoding methods, depending on the input pixel stream. There is no correlation between streams as to which code encodes which input pixel position. Lack of correlation makes merging streams challenging.

Disclosed herein are embodiments of mechanisms to apply planar SRLE to compress multi-planar image data into a single consolidated stream, and mechanisms to decompress the stream. These mechanisms may be referred to herein as Composite SRLE (CSRLE) mechanisms.

The disclosed compression mechanisms serialize SRLE codes in a way that (1) reduces the size of an ASIC implementation of a CSRLE decompressor, (2) prevents decoders inside a CSRLE decompressor from deadlocking, and (3) maintains the same level of compression as conventional SRLE encoders without the addition of new codes.

CSRLE mechanisms may integrate SRLE efficiently into composite image rendering pipelines while yielding comparable and even identical compression ratios as an equivalent set of individual planar SRLE encoders. Rendering pipeline performance may be improved, for example by obviating the need to reformat images from composite to planar format before encoding or decoding. CSRLE decompression mechanisms may be cost-effectively implemented in hardware ASICs, by reducing the need for buffering. Hardware implementations may also consume less area than other mechanisms. An n-plane on-the-fly CSRLE decompressor module, as implementation in an ASIC, may be comparable, or smaller, in size to an operationally-equivalent set of n individual on-the-fly SRLE decoders. In the table below, every module is assumed to be approximately of the same size.

| One CSRLE Decompressor | n SRLE Decoders |
|---|---|
| n SRLE Decoders | n SRLE Decoders |
| 1 Deserializer | 0 Deserializers |
| 1 Picker | n Pickers |
| 1 Packer | n Packers |
| n + 3 Total Modules | 3n Total Modules |
| 10 Total Modules for n = 7 Planes | 21 Total Modules for n = 7 Planes |

When implemented as a memory-to-memory module, an n-plane CSRLE decompressor module is smaller in comparison to n SRLE decoders. Each instance of a SRLE decoder typically comprises its own read and write DMAs. This amounts to n read DMAs and n write DMAs across n SRLE decoders. A CSRLE decompression module comprises use a single read DMA and a single write DMA.

Reading a single stream from memory, as with a CSRLE mechanism, offers greater system and DRAM efficiency than reading n streams. Although the total amount of data read from memory is the same in either case, the number of memory requests and return data packets is substantially reduced with CSRLE mechanisms, for example by a factor of 7 for 7-plane images.

A single serialized encoded stream consumes less memory than n encoded streams in systems that require buffers to be aligned to memory boundaries. A cache line, which can be 128 bytes, is a common alignment requirement. In such a system, each individual stream is required to start at a 128-byte boundary, which wastes on average n×64 bytes. An example illustrates the impact on memory utilization this can cause. The memory waste associated with the alignment constraint is 448 bytes for a 7-plane image object. A PDL page containing 1,000 image objects will waste on average 448,000 bytes for a single page.

FIG. 1 provides a high-level depiction of a printing system 100 processing a JPEG object carried in a PDL file.

A PDL file sent to a printer 124 is processed by a PDL interpreter 104. The PDL interpreter 104 may be included in the printer 124 or may be included in a different system component, such as a user's laptop computer system or a document management system. Similarly, the page store 120 and/or memory 134 may be included in the printer 124.

When the PDL interpreter 104 encounters a JPEG-encoded object in the PDL file it generates a JPEG encoded stream 108 from the object and provides the JPEG encoded stream 108 to image processing logic 102. The image processing logic 102 utilizes a JPEG decoder 106 to transform the JPEG encoded stream 108 into a deserialized stream 110 of chunky pixels.

The deserialized stream 110 is transformed by color conversion logic 112 into a color converted stream 114. A CSRLE compressor 116 transforms the color converted stream 114 into an encoded stream 118 (which is compressed relative to the color converted stream 114) for storage in a page store 120 (e.g., machine memory).

Printing is carried out by way of a render pipeline 122 in a printer 124. An encoded stream 118 from the page store 120 is transformed via a CSRLE decompressor 126 to a deserialized stream 128, which in turn is transformed through a render module 130 to a rendered stream 132 in machine memory 134 (from which the pixel values may be applied to a print head, display, etc. for rendering).

The two processing pipelines are distinct from one another. Image processing utilizes CSRLE compression and the rendering pipeline utilizes CSRLE decompression. A CSRLE-compressed stream passes between the pipelines via the page store 120 (implemented for example using a large memory buffer, hard disk drive, or solid state drive).

A CSRLE compressor and decompressor may be implemented with a set of planar SRLE encoders and decoders, respectively. In each, the set of encoders/decoders operate independently and in parallel. In a compressor, these independent streams are interleaved into a stream of compression codes, i.e. serialized, and in the decoder, the inverse process is performed. Serialization involves interleaving, in some fashion, independently-generated, non-aligned streams from the n encoders, and deserialization in the decompressor requires settings, in some form, to reverse the process to produce the original n independent streams to feed into the n decoders.

Figure 2:
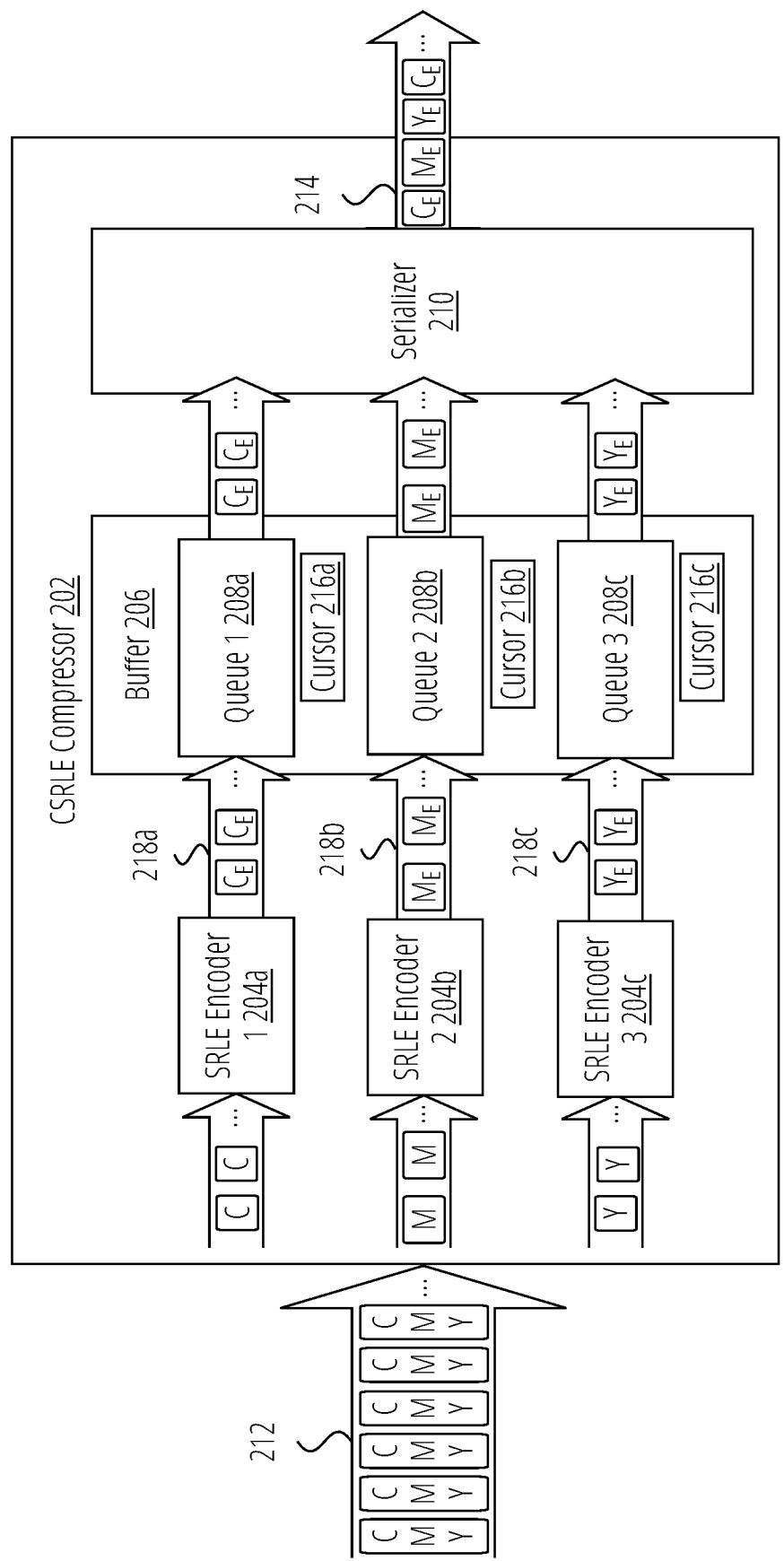
FIG. 2 depicts a CSRLE compressor configured for three image planes.

FIG. 2 depicts a CSRLE compressor 202 configured for three image planes. The CSRLE compressor 202 utilizes a stream merging mechanism that reduces buffer requirements for the corresponding decoder. The CSRLE compressor 202 comprises n=3 independently operating SRLE encoders 204a, 204b, and 204c, a buffer 206 with n=3 independent queues 208a, 208b, and 208c, and a serializer 210. This example configuration supports compressing images composed of n=3 planes, but may be readily adapted for images comprising other numbers of planes by adapting the number of encoders and queues accordingly.

The CSRLE compressor 202 operates on composite pixels provided in a chunky pixel input stream 212. This may take the form of a single stream of chunky pixels, n planar pixels per input datum, or n streams of component pixels that transfer in chunky form. The output of the CSRLE compressor 202 is a code sequence 214 of encoded values. To enforce a proper ordering in the code sequence 214 such that the code sequence 214 may be decoded efficiently, the CSRLE compressor 202 utilizes a number of cursors 216a, 216b, and 216c, each associated with one of the queues (queue 1 208a, queue 2 208b, and queue 3 208c respectively).

Figure 3:
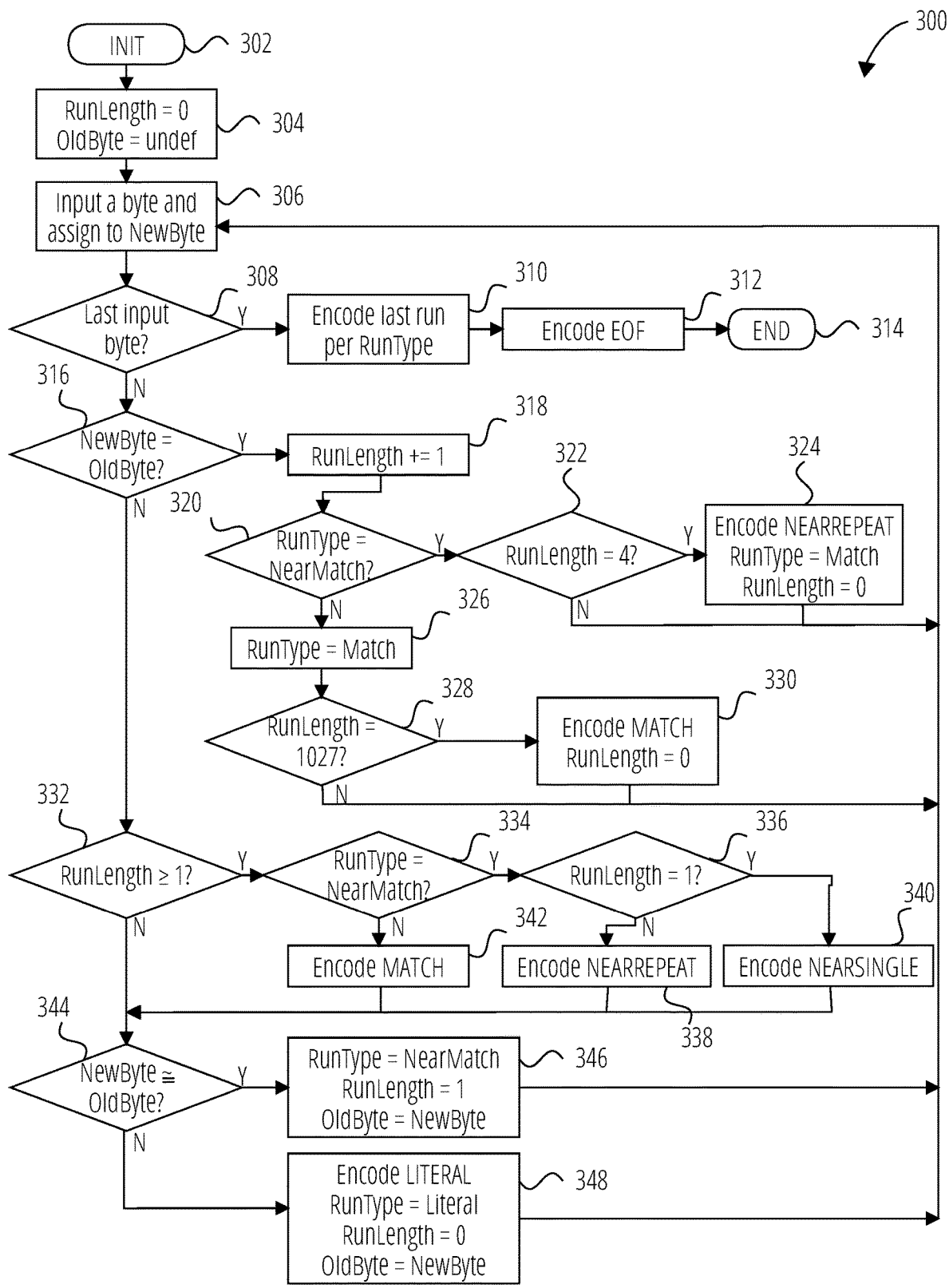
FIG. 3 depicts a flow diagram 300 for a process in accordance with one embodiment.

Each SRLE encoder follows the process depicted in FIG. 3 to independently (of the other SRLE encoders) generate a stream of codes. Codes are generated in the encoding states for each of the image planes by a respective one of the SRLE encoders and transmitted to a corresponding one of the queues in the buffer 206. In the depicted example, SRLE encoder 1 204a outputs a code stream 218a for the C plane to queue 1 208a, SRLE encoder 2 204b outputs a code stream 218b for the M plane to queue 2 208b, and SRLE encoder 3 204c outputs a code stream 218c for the Y plane to queue 3 208c.

Conventional SRLE codes range vary in size from 6 to 16 bits, and the total variety of codes is 1,447. In one embodiment all codes are normalized to 16 bits in size, and queues are configured to hold 16-bit values. In another embodiment each variable-sized code of conventional SRLE code is mapped to an 11-bit value. Eleven bits can define 2,048 unique values, which is sufficient to re-code 1,447 conventional SRLE codes. Re-coding to 11-bit values may take place in a separate step/stage, or conventional SRLE encoders may be modified to output 11-bit codes.

FIG. 3 depicts a flow diagram 300 for SRLE encoders utilized by CSRLE mechanisms, in one embodiment. Each incoming byte or unit of data of a data stream may be categorized and grouped as a type of run (RunType). FIG. 3 depicts setting RunType to a symbolic value of Literal, NearMatch, or Match. Once a run is accumulated, Literal and Match runs are encoded as LITERAL and MATCH codes, respectively, and a NearMatch run is encoded as either a NEARSINGLE code or a NEARREPEAT code. Following the encoding, the code flows to an output data stream.

Although the example flow diagram 300 depicts operations in a particular sequence, those of ordinary skill in the art may recognize that the depicted sequence may be altered in some manners without departing from the scope of the present disclosure. For example, some of the operations depicted may be performed in parallel or in a different sequence that does not materially affect the function of the flow diagram 300. In other examples, different components of an example device or system that implements the flow diagram 300 may perform functions at substantially the same time or in a specific sequence.

A LITERAL code is used to encode a single initial value and single values that deviate beyond a defined range from a previous value in a sequence of values in a data stream. For example if a range is defined as negative sixteen to positive fifteen or approximately an absolute value difference of fifteen or sixteen, then a value of fifty would be encoded as a LITERAL if it followed a value of twenty. However, if the value fifty followed the value forty five it would not be encoded as a LITERAL because the difference, five, falls within the range of negative sixteen to positive fifteen.

A NearMatch run type may be used to identify input values that deviate within the defined range from a previous value in the sequence of the data stream. A NearMatch run type may be encoded as a NEARREPEAT code that includes a runlength field in order to indicate the number of consecutive identical values that occur in a data stream. In one embodiment, a separate NEARSINGLE code having a smaller size than the generic NEARREPEAT code may be used as an optimization in terms of compression. The NEARSINGLE code may not have a runlength field, making it smaller than the generic NEARREPEAT code that may have a runlength field of any size. In another embodiment, a NEARSINGLE code may not be used and a NEARREPEAT code may encode a runlength of one. In one embodiment, the size of the runlength field may be ten bits.

A MATCH code may be used to encode values that are identical to the values that precede them in the sequence of the data stream. For example, if the values following a LITERAL are exactly the same, then a MATCH code may be used. A MATCH code may include a runlength field in order to indicate the number of consecutive identical values that occur in the data stream. In one embodiment, the runlength field may be ten bits. The runlength field size may be altered to handle longer or shorter runs.

In one embodiment, the encoding process may begin at initialization 302 by initializing a set of state variables. The state variables may include a run type variable that tracks a type of run that is currently being processed, a runlength variable that tracks the length of a current run (i.e., the number of identical consecutive values), and an "OldByte" value which tracks the preceding value that was processed. In this context a run is a set of values that can be encoded in a single code. Run types of Literal, NearMatch, and Match correspond to the types of possible encodings (e.g., LITERAL, NEARSINGLE, NEARREPEAT, or MATCH). The initial OldByte value may be zero, undefined, or any other known value, and the initial runlength may be zero, as shown in block 304.

The process may continue by sequentially retrieving the next value in a data stream as an input byte, and assign its value to NewByte at block 306. The data stream may contain eight bit per pixel values (bpp). In another embodiment, the basic unit of encoding may be a word or a set of bits of any length. A determination may then be made at decision block 308 as to whether the end of a file has been reached (i.e., the input byte is the last input byte). If the end of file has been reached, the process proceeds to block 310 and the last run may be encoded based on designated run types and calculated runlengths in one embodiment. An additional EOF (end of file) code may be output (block 312), and the process may terminate at end block 314.

If the byte is not the last input byte at decision block 308, the NewByte value may be compared with the OldByte value to determine if it is identical to the stored OldByte value at decision block 316. If the new value is identical to the old value then the runlength may be increased by one at block 318. The runlength variable may act as a tally to track the length of a run as each value in a data stream is processed. After the runlength tally has been increased, then the run type may be checked at decision block 320 to determine if a NearMatch has been designated for the current run. For example, if a sequence of values such as 0×20 0×26 0×26 (hexadecimal) occurs, the second value 0×26 starts a run of a NearMatch. When the third value 0×26 is processed, the runlength may be increased by one. The run may not be encoded until a change in value is detected or the runlength exceeds a fixed limit of encoding.

If a NearMatch is detected at decision block 320, the process may then check the run length at decision block 322 to determine if the encoding limit has been reached. In one embodiment, the encoding limit may be four. If the encoding limit has not been met, process may return to block 306 and a next value may be retrieved for processing. If the runlength encoding limit has been met at decision block 322, the run may be encoded at block 324 as a NEARREPEAT. The run type may then be designated as a Match for any subsequent values that are also identical. A Match run type is designated if a value in a sequence is an exact match with a preceding value that was encoded as a LITERAL or, in circumstances where runlengths are finite, a NEARREPEAT. The runlength may then then be reset to zero at block 324. The next value can then be retrieved for processing (block 306). The check for the runlength of four and encoding of the NEARREPEAT code is based on a NEARREPEAT code that only has two bits for encoding the runlength. In another embodiment, the NEARREPEAT code may have a larger or smaller bit length allowing for the encoding of different sizes of runlength. The check for runlength may be adjusted accordingly to the number of bits for the runlength field. In a further embodiment, the NEARREPEAT code may be structured to handle any size of runlength.

In the instance where the run type is not a NearMatch as determined at decision block 320, then a run type of Match may be designated at block 326. In one embodiment, if a Match has been designated, then a check of the runlength may be made to determine if the encoding limit has been reached at decision block 328. In one embodiment, the encoding limit may be 1,027. If the runlength has not exceeded its encoded limit at decision block 328, then the next value is retrieved for processing (block 306). If the runlength has exceeded its limit at decision block 328, then the run may be encoded as a MATCH code at block 330. The runlength may then be reset to zero, and the next value may then be retrieved for processing (block 306). The check for the runlength of 1,027 and encoding of the MATCH code is based on a MATCH code that only has ten bits for encoding the runlength. In another embodiment, the MATCH code may have a larger or smaller bit length allowing for the encoding of different sizes of runlength. The check for runlength would be adjusted accordingly to the number of bits for the runlength field. In a further embodiment, the MATCH code may be structured to handle any size of runlength.

In an instance where the new value does not equal the old value at decision block 316, then a check may be made at decision block 332 to determine if the runlength is greater than zero. A runlength greater than zero indicates that an unencoded run has ended because a change in value has occurred. A check of the run type is made to determine if the run is a NearMatch run at decision block 334. If the run was not a NearMatch run then it is encoded as a MATCH code at block 342. If the run is a NearMatch then a check is made at decision block 336 to determine if the runlength was equal to one. If the runlength is equal to one then the run is encoded as a NEARSINGLE code block 340. If the runlength is not equal to one then the run is encoded as a NEARREPEAT code at block 338. In another embodiment, a NEARSINGLE code may not be used and all runs that are not of type Match are encoded as a NEARREPEAT code. Regardless of the encoding of the run (LITERAL, NEARSINGLE, NEARREPEAT, or MATCH), processing continues to decision block 344 because the encoding of the run did not include the new value. The new value indicated the end of a run by deviating from the old value.

In an instance where a new value is not equal to the old value (decision block 316) and the runlength is zero at decision block 332, the new value may be compared to the old value to determine if the difference falls within a predefined range at decision block 344. In one embodiment, using eight bpp values, a range of negative sixteen to positive fifteen may be used. This range determines if the lower order bits have changed in the new byte from the low order bits in the previous byte. In the case where the first value of a stream is being analyzed then a default known old value may be used. For example the default value may be zero. If the difference is out of range then the value is encoded as a LITERAL and the run type is designated as Literal at block 348. For example, an initial value of a data stream may be 0x20. If the default old value is zero then the value of 0x20 is encoded as a LITERAL. The runlength may be reset to zero at block 348 because the last retrieved value in the current run has been encoded and the next value to be retrieved at block 306 will start the next run.

However, if the difference is in the predefined range at decision block 344, then the run type may be designated as a NearMatch at block 346. Designating a run as a NearMatch is a categorization that identifies that a current sequence of values being analyzed is to be encoded as a NEARSINGLE or NEARREPEAT and that the length of the run must be determined before the encoding can complete. The runlength for the NearMatch may be set to one at block 346 because the current run includes the last retrieved value. In either case (encoding as a Literal at block 348 or designation as a NearMatch at block 346), the new value may be saved as the old value before the next value is retrieved (block 306) and the processing of the data stream may continue.

In one embodiment, the encoding scheme illustrated in the flow diagram 300 may be a first encoding mode that is used to encode a stream of data. The first encoding process may be optimized for high resolution original image data. The first encoding process may be the default process. Data encoded using this first encoding mode may be decoded using a simple decoding process that begins by obtaining the next code to be decoded, then generates the binary value derived from the code. LITERAL codes contain the exact binary value. NEARSINGLE and NEARREPEAT codes indicate the difference between the binary value to be generated and the preceding binary value that was generated. MATCH codes indicate that the binary value to be generated is identical to the preceding binary value. The decoding process may determine if the run is complete by checking the runlength of the code that is being evaluated. If the run is not complete, the decoding process may decrease the runlength and generate the next value. When the run is completed, the decoding process may check for the end of file code. If the end of file has not been reached then the next code to be evaluated may be retrieved. If the end of file is found then the decoding process may terminate.

In one embodiment, a second encoding process may be utilized in conjunction with the first encoding process described by flow diagram 300. The second encoding process may be used for data streams that are known to contain many long runs of values. For example the second encoding process may be used for images that contain many long runs of identical pixels. In one embodiment, the second encoding process may be used with data that has been filtered. The second process may encode the full value of a pixel, byte, or unit of data along with the runlength for the number of identical values that immediately follow it. The first encoding method (i.e., SRLE encoding as described by flow diagram 300) and the second encoding method may include codes that indicate a switch to the other mode. This may allow an encoder to encode a document using both encoding processes according to the type of data or known properties of a document. Switching between the first process and the second process may be done adaptively by an encoder within a scanline, from scanline to scanline or from band to band as needed. This may allow improved compression ratios while preserving image quality. The switch codes may allow a decoder to easily detect the switch in encoding processes to decode a file or data stream quickly. In another embodiment, other encoding processes may be utilized as the second encoding method. Other second encoding methods include the use of TIFF, JPEG and similar algorithms.

The first and second encoding systems may be used with documents that are segmented into planes (e.g., cyan, yellow, magenta and black planes), bands, or similar structures. The first and second encoding systems may also be used with object oriented documents and files where the encoding is used primarily on the data associated or encapsulated by the files or interpretations of such files. Both processes of encoding are lossless.

The first encoding system described by flow diagram 300 may achieve compression ratios between 513.5:1 and 0.8:1 (i.e., a ratio of compression of 513.5:1 between the compressed file and the original file). The compression ratio for a file of a photograph having 600 dots per inch (dpi) averages between two and six to one. The compression ratio for a file containing text averages greater than thirty to one. The compression ratio for a file containing line art averages greater than ten to one. The second encoding system may achieve compression ratios between 391.2:1 and 0.73:1. The compression ratio for a file of a photograph having 600 dpi averages between three and ten to one. The compression ratio for a file containing text averages greater than thirty to one. The compression ratio for a file containing line art averages greater than thirty to one.

Figure 4A:
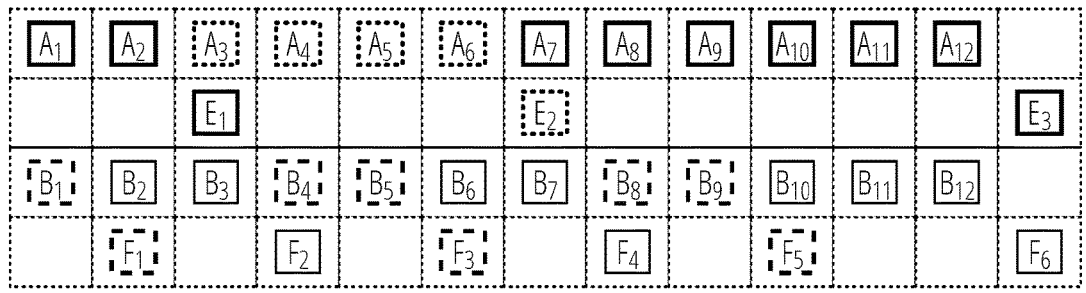
FIG. 4A-FIG. 4C depict CSRLE compression of a portion of a chunky image with two planes.

The CSRLE compressor consumes chunky pixels as indivisible units and internally separates and routes the planar pixel values to each SRLE encoder. Thus, the individual SRLE encoders are synchronized at their inputs. However, the individual encoders generate output codes at different times (asynchronously from one another). FIG. 4A depicts CSRLE compression of a portion of a chunky image with just two planes.

In FIG. 4A, $A_i$ and $B_i$ denote pixel values for planes 1 and 2, respectively, and $E_j$ and $F_j$ denote output codes from planar encoders SRLE1 and SRLE2, respectively. The input pixel stream comprises 12 chunky pixels, $(A_1, B_1)$, $(A_2, B_2)$, $(A_3, B_3)$, ..., $(A_{12}, B_{12})$. Planar stream $A_1$-$A_{12}$ is applied to encoder SRLE1 and transformed into three codes, $E_1$, $E_2$, and $E_3$. Planar stream $B_1$-$B_{12}$ is applied to encoder SRLE2 and transformed into six codes, $F_1$-$F_6$.

Figure 4B:
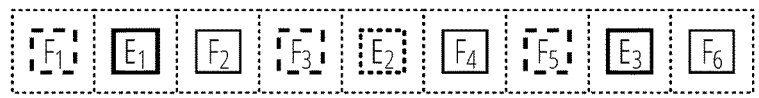

With a constant input rate of one chunky pixel per cycle, and assuming no buffering, codes would be output from the two encoders in the sequential order depicted in FIG. 4B. This timeline assumes sequential logic, and each column represents a cycle. The different box styles correlate a run of planar pixel values to an output code.

Figure 4C:
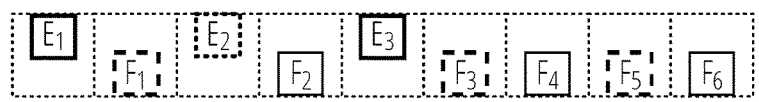

In one embodiment, the CSRLE decompressor utilizes an ordering mechanism for codes in the serialized stream that does not reduce the compression ratio by adding additional coordination markers/codes in the compressed stream, nor require the decoder to utilize complex state machines or large memory buffers. FIG. 4C depicts a serial stream that would result from a naïve round-robin ordering algorithm of the planar encoder outputs. A CSRLE decompressor should also operate effectively on differing pixel rates embodied in the input and outputs data streams, and avoid deadlocks.

Figure 5:
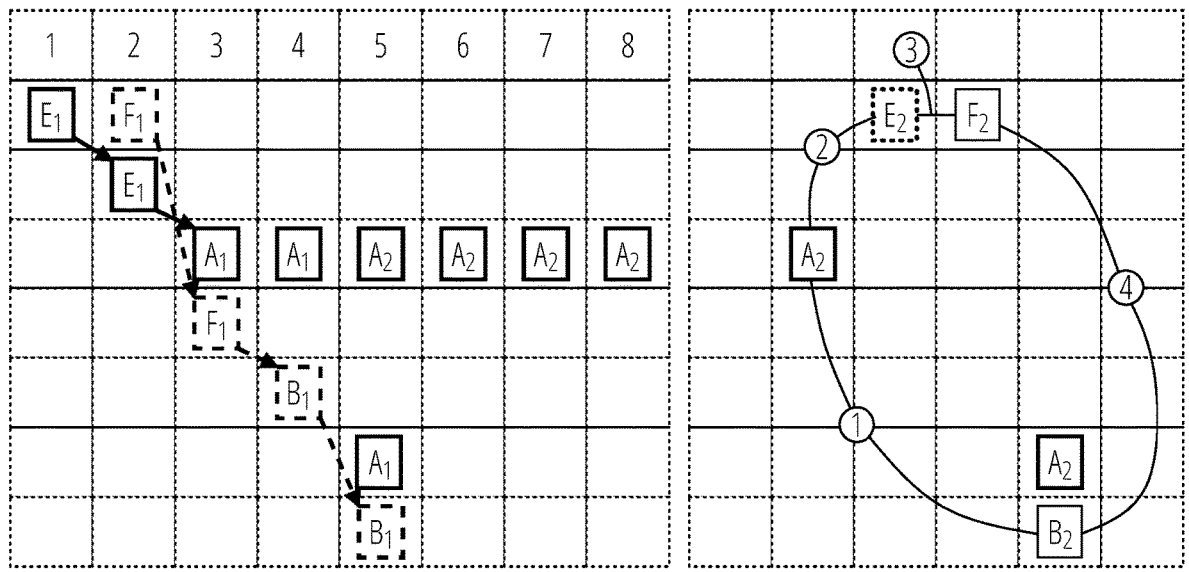
FIG. 5 depicts a scenario in which decompression deadlock may occur.

FIG. 5 depicts a scenario in which decompression deadlock may occur. $E_1$ decodes to a run of two pixels, $A_1$ and $A_2$, and $F_1$ decodes to a single pixel, $B_1$. In cycle 1, $E_1$ is taken from the input stream and given to SRLE1. In cycle 2, $F_1$ is given to SRLE2. In cycle 3, the first decoded pixel, $A_1$, is available, but SRLE1 stalls for an additional cycle, until SRLE2 makes $B_1$ available in cycle 4. This allows cycle 5 to form, output, and transmit $(A_1, B_1)$ as a chunky pixel.

Also during cycle 5, SRLE1 makes $A_2$ available, but SRLE1 is again stalled because there is no $B_2$. The decompressor is now deadlocked.

1. $A_2$ is waiting for $B_2$, because $(A_2, B_2)$ must be output as a pair.
2. $B_2$ is waiting for $F_2$.
3. $F_2$ is waiting for $E_2$.
4. $E_2$ is waiting for $A_2$.

When the deadlock occurs, $E_2$ and $F_2$ are next in the input stream, and SRLE1 and SRLE2 are stalled. SRLE1 cannot accept a code until it outputs the last pixel of $E_1$, which is $A_2$. $A_2$ cannot be popped from SRLE1 until SRLE2 makes $B_2$ available, because $(A_2, B_2)$ must be transmitted as a pair. $B_2$ is encoded in $F_2$, but SRLE2 doesn't have access to $F_2$ until $E_2$ is consumed by SRLE1. This is the deadlock (FIG. 5).

This example assumed zero buffering. To avoid deadlocks, the decompressor may utilize buffering. Buffering is also utilized by the CSRLE compressor during serialization. The amount of buffering is an important implementation factor, and for both the compressor and decompressor, the amount of buffering depends on the serialization algorithm.

In some implementations, PDL interpretation is performed by software logic executing on a general purpose central processing unit, whereas rendering is performed by embedded hardware logic. This may be a common scenario in printing applications, for example. Hardware implementations of a CSRLE decompressor may be subject to strict memory constraints, so that it is preferred to minimize buffering requirements that call for significant amounts of on-chip memory (e.g., SRAM), or long-latency reads from main memory (e.g., DRAM). It is therefore desirable for such implementations to utilize a CSRLE decompression mechanism with low buffering requirements (the encoder may still avail of larger buffers).

Figure 6:
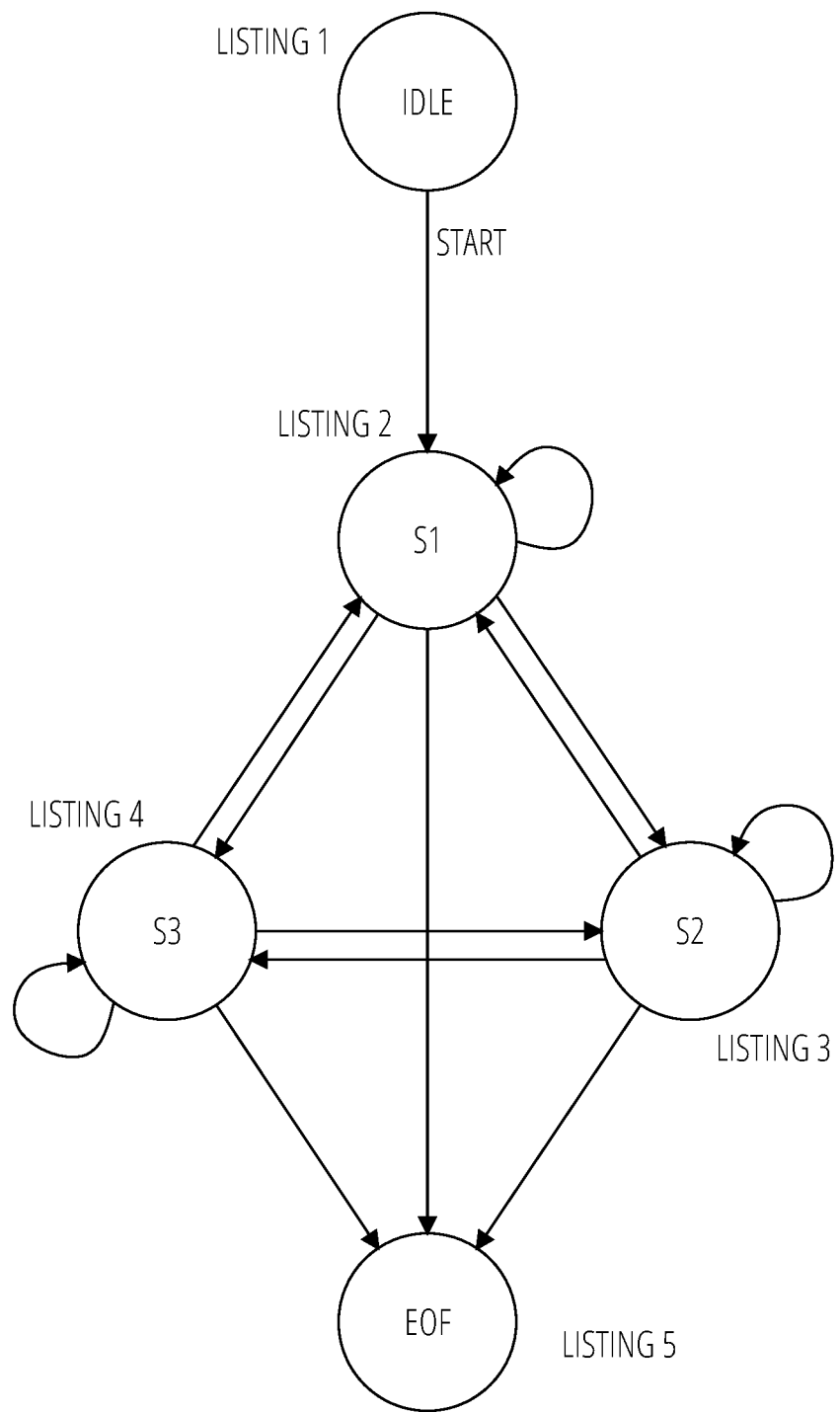
FIG. 6 depicts a CSRLE compressor state diagram in accordance with one embodiment.

An effective compression/decompression mechanism addressing these constraints may be implemented in accordance with the state machine logic depicted in FIG. 6. A cursor (position pointer/marker) is associated with each queue 208a-208c of the CSRLE compressor 202. A cursor position is initialized to 1 and incremented each time a SRLE code is popped from a queue and output by the serializer. The increment amount is the count of pixels represented by the enqueued code. Cursor values are used and updated during serialization.

The serialization portion of the encoding algorithm may be implemented as a state machine. The states may be represented as IDLE, S1, S2, S3, ..., Sn, and EOF. One Si state is associated with each queue. The only transition from the IDLE state is to state S1. Each Si[i=1 to n] state can transition to any other Si state, including itself, or to the EOF state. The only transition from the EOF state is back to the IDLE state. The state machine compares cursor positions to select the next queue to pop outputs from; popping values off of a queue updates (increments) the queue's cursor value.

When started, IDLE unconditionally transitions to S1 after performing some initialization. At S1, if the queue for image plane 1, Q1, is empty, the system waits for SRLE1 to push a code into Q1. If there are already codes in the queue, or as a consequence of SRLE1 pushing a code into Q1, SI pops it, outputs it as the first set of bits in the output stream, and transitions to S2. A similar process is followed for other state transitions, e.g., from S2 to S3, and so on. At each state the cursor positions are compared to determine the next state transition.

The next state chosen is the one that has the lowest cursor position value, and if there is a tie, the lowest numbered state. Before transitioning from an Si state, the cursor position for the corresponding queue is incremented by the run length associated with the popped code. Generating a serial stream of SRLE codes in this manner helps ensure the decompressor can deserialize it with a computationally-efficient algorithm and a minimum of buffering.

Listings 1-5 below exemplify the state transition logic in one embodiment.

Once the last input pixels are encoded and all SRLE encoders are idle, a similar sequencing of states is followed, except states associated with empty queues are skipped. Once the last queue is empty, the current Si state transitions to EOF, generating an EOF code in the serial stream. From there the transition is to the IDLE state, concluding serialization/compression.

The depths of the queues may be configured to avoid deadlock in the compressor. The most straightforward approach uses depths corresponding to the longest run of pixels that can be encoded. A deadlock is possible if the queues are configured too small.

By way of example, consider a CSRLE compressor configured to process images comprising n=2 planes. The input stream to each SRLE encoder of the compressor consists of 1,028 chunky pixels, numbered 1 to 1,028. Plane 1 consists of 1,028 identical values, and plane 2 consists of 1,028 different values, such that plane 1 would encode as one LITERAL and one MATCH with a count of 1,027, and plane 2 would encode as 1,028 LITERALs.

With correctly sized queues, compression takes place as follows.

The SRLE encoders for each plane process the first inputs from each plane, and enqueue LITERAL codes for each. The serializer steps through states IDLE, S1, and S2, popping and emitting associated codes, at which time both queues are empty, and the cursor position for each is 2. Because this is a tie, S2 transitions to S1.

For chunky pixels 2 to 1,027, SRLE1 increments its MATCH count to 1,026 but enqueues nothing, while SRLE2 enqueues 1,026 LITERALs. The serializer has remained in state S1 this entire time, because Q1 has remained empty this entire time.

When the component pixel values of the $1,028^{th}$ and final chunky pixel are routed to the encoders, SRLE1 reaches its maximum threshold and enqueues a MATCH code, and SRLE2 encodes a $1,027^{th}$ LITERAL. Having consumed the last component pixel values, both encoders go idle. Q1 has one MATCH code, Q2 has 1,027 LITERAL codes, and both cursor positions equal 2. Now that Q1 has a datum, serializer state S1 can finally take action.

If queue depths were 1,026, a deadlock would have occurred. When Q2 filled, it would have stalled SRLE2's pipeline, which would have prevented it from requesting a $1,028^{th}$ pixel. This would have prevented SRLE1 from inputting its $1,028^{th}$ pixel, because pixels input into SRLE1 and SRLE2 operate in lockstep. SRLE1 and SRLE2 would both be stalled.

Returning to the example, Q1 has one MATCH code, Q2 has 1,027 LITERAL codes, and both cursor positions equal 2.

S1, which has been waiting, can now pop the MATCH code that was enqueued, which has a count of 1,027. S1 adds this value to the queue's cursor position, which becomes 1,029. S1 then outputs the MATCH code, compares all cursor positions, and transitions to S2 because its cursor position is the lowest.

S2 pops a next LITERAL code, and since it encodes a single pixel, increments Q2's cursor position by 1, to the value 3. S2 then outputs the LITERAL code, compares all cursor positions, and finds that its value, 3, is less than Q1's value of 1,029, so S2 "transitions" to itself.

The previous step repeats another 1,026 times. This outputs 1,026 more LITERAL codes, advances Q2's cursor to 4, 5, 6, and so on, until it reaches 1,029, at which time, Q2 goes empty. Because Q1 is also empty, and SRLE1 and SRLE2 are idle, S2 transitions to EOF, which outputs an EOF code. Compression and serialization are complete.

The resulting serial output stream comprises the following, where underlined codes are for plane 1 and others are for plane 2.

L1, L1, M1027, L1, L1, L1, . . . , L1, L1, L1

Conventional SRLE encoders generate codes for runs of up to 1,027 pixels, requiring at least 1,027 entries per planar queue. This size may be reduced if the maximum length of an encoded run is reduced. For example, if reduced to 500, then queue sizes may be reduced to 500 entries. Such reductions may prove desirable for implementations subject to stringent memory utilization constraints.

Figure 7:
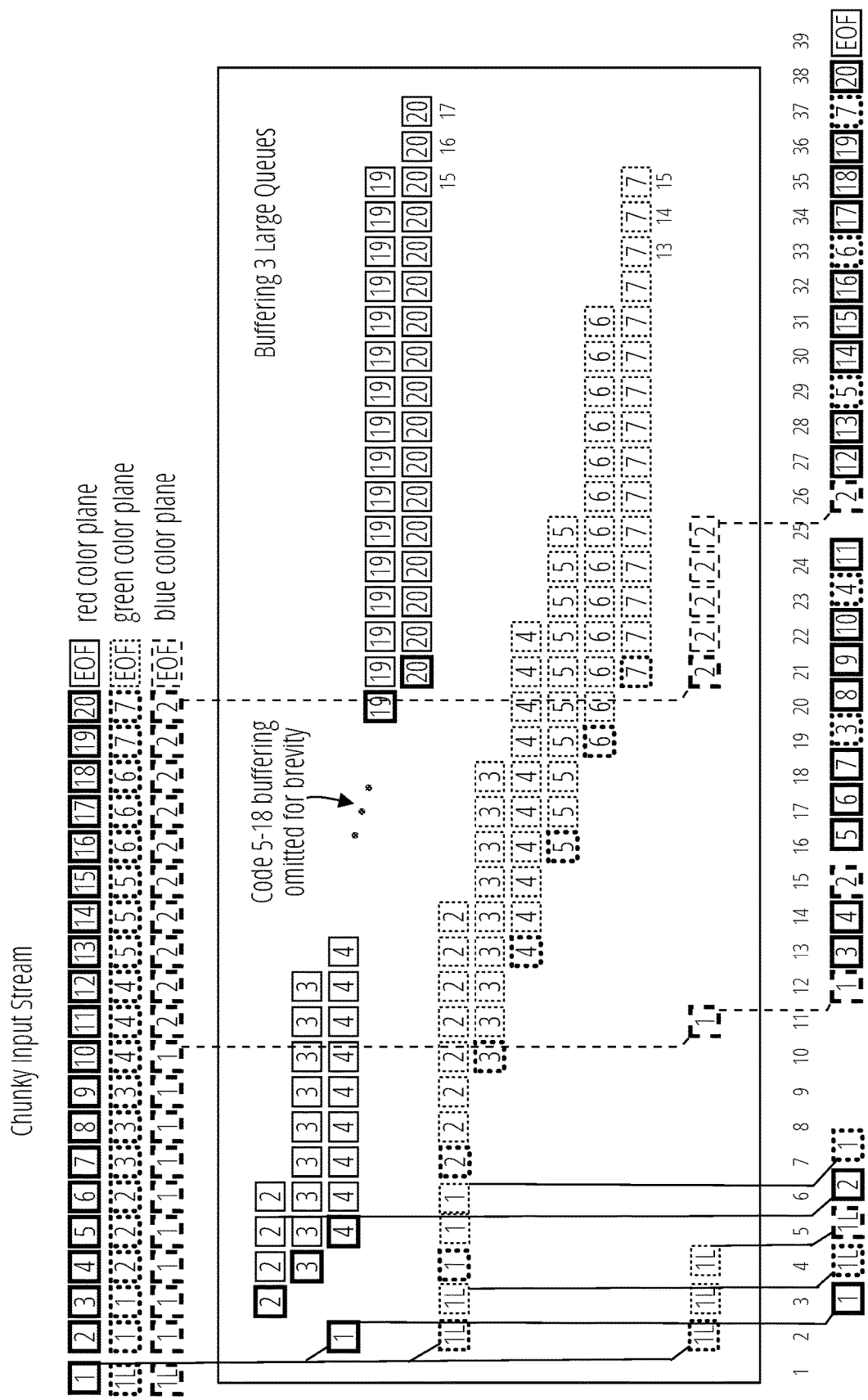
FIG. 7 depicts an example of CSRLE compression of a three-plane stream.

FIG. 7 depicts an example of compressing a three-plane stream of chunky pixels. Ordering by cursor position requires a CSRLE compressor to have sufficient buffering to hold codes until it is time to emit them. The depths of queues are denoted by the length of the bars. In this example, the $20^{th}$ code for the red plane had to be held for 17 cycles, and the $7^{th}$ code for the green plane had to be held for 15 cycles. This was required, in part, because the blue plane had long runs, which took more time to count. While they were being counted, codes for other planes had to be "saved" until they could be emitted after codes for the blue plane.

Figure 8:
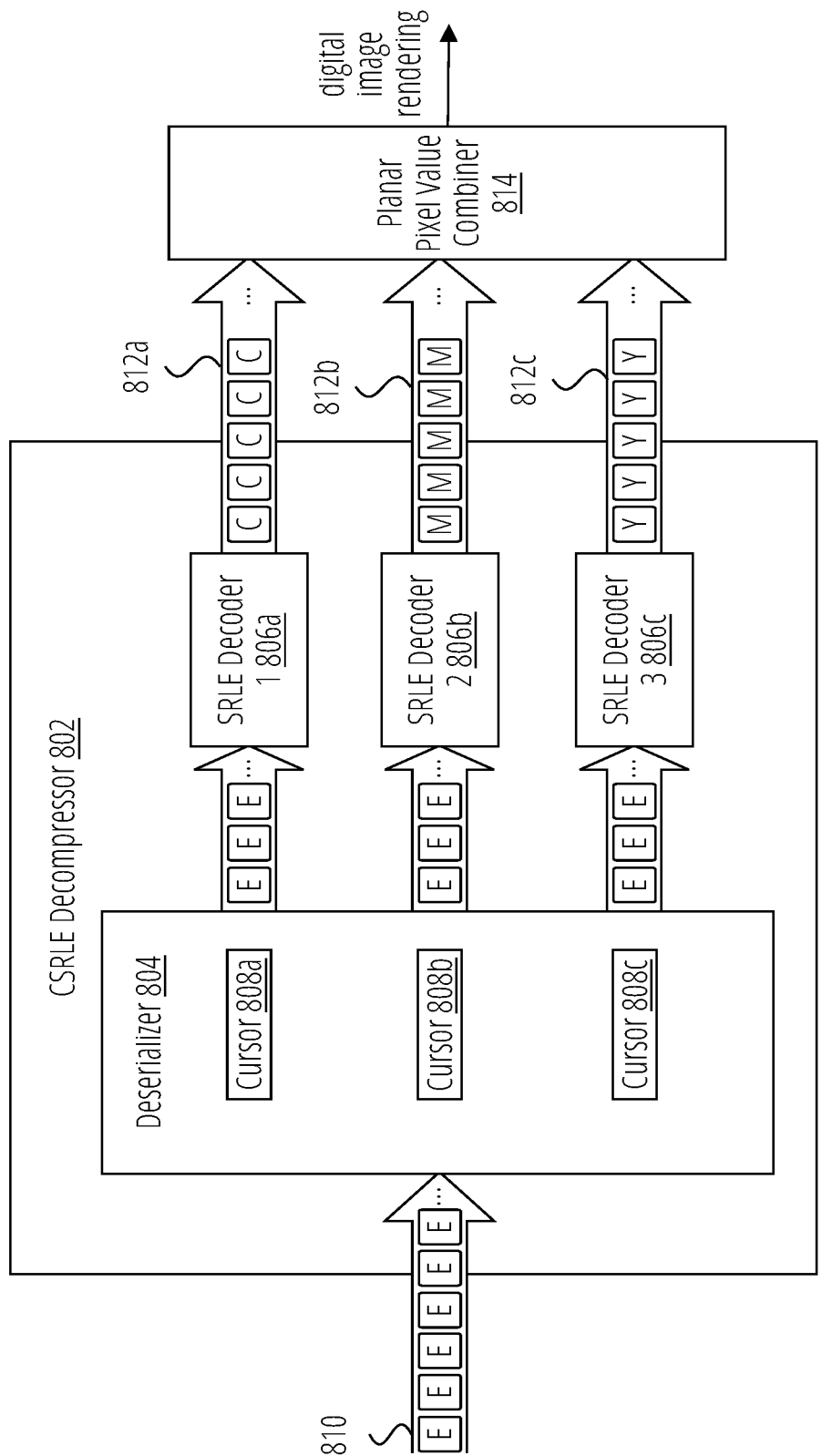
FIG. 8 depicts a CSRLE decompressor in accordance with one embodiment.

FIG. 8 depicts an exemplary block diagram of a CSRLE decompressors 802 configured for three image planes. Generally, the mechanisms disclosed are applicable to any number of image planes.

A CSRLE decompressor 802 comprises a deserializer 804 and n=3 independently operating SRLE decoders 806a, 806b, 806c. The deserializer 804 maintains respective queue cursors 808a, 808b, 808c for the decoders. The deserializer implements an inverse of the algorithm used by the serializer, so it can extract and apply SRLE codes from the serial input stream 810 to the correct SRLE decoders, which transform the SRLE codes back into planar pixel output streams 812a, 812b, and 812c. Unlike a CSRLE compressor, a CSRLE decompressor does not require large buffers. In one embodiment, the decoders are conventional SRLE decoders, and they execute independently.

Listings 6-10 below exemplify the state transition logic in one embodiment.

Figure 9:
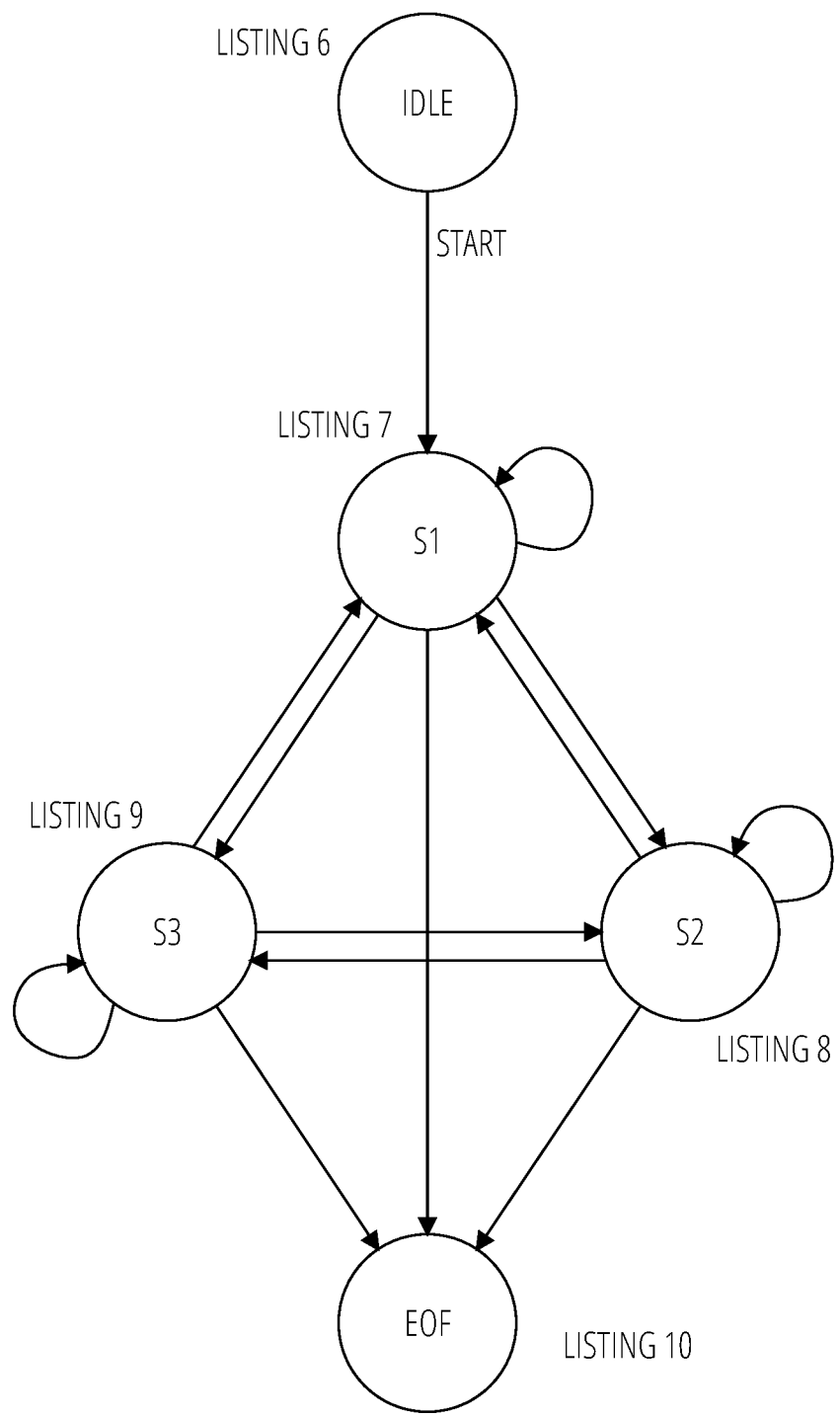
FIG. 9 depicts a CSRLE decompressor state diagram in accordance with one embodiment.

Referring to FIG. 9 a CSRLE deserializer utilizes a plurality of cursors to track the ordering of codes in a serial input stream. The deserializer may utilize states and transition logic similar to that of the CSRLE serializer in some respects, but also configured to route codes from a single input queue to the appropriate decoder. Likewise with the serializer, any Si state may transition to any other Si state (i=1 . . . n), including itself, or to EOF, and only EOF transitions to IDLE.

Cursors are initialized with a value of 1, and the state transitions from IDLE to S1. For purposes of description, the serial input stream may be assumed to be provided by a FIFO (not depicted) from which a code is popped by each Si state. For example, S1 pops a code $E_1$ (see FIG. 5), increments the cursor position for plane 1, and routes the code to SRLE1. S1 then examines the cursor positions of all planes, selects the state with the lowest cursor position, and if there is a tie, it selects the lowest numbered state. At this point, the cursor position for plane 1 is 2, and all others are 1, so S1 transitions to S2. This repeats through Sn, at which time, the cursor position for all planes is 2, so Sn transitions to S1.

The next code is for plane 1 and can be any code. S1 pops the code, extracts its run length, adds the value to plane 1's cursor position, and routes the code onto SRLE1. Since the cursor position for all other planes is 2, S1 transitions to S2.

S2 through Sn−1 repeat the same actions, and as they do, cursor positions are incremented by varying amounts. When it is time for state Sn−1 to transition, all cursor positions are greater than two, except plane n, so Sn−1 transitions to Sn.

When it is time for state Sn to transition, all cursor positions can vary, so Sn can transition to any other Si state (including itself). As before, it transitions to the state with the lowest cursor position, and if there is a tie, to the lowest numbered state.

Ordering by cursor position requires a low level of buffering in a CSRLE decompressor. This is because, at any point in time, all SRLE decoders utilize the correct code at the correct point in the input sequence, so they are all outputting values for the $i^{th}$ (chunky) pixel. Because all the output values of the SRLE decoders at a given time are part of the same chunky pixel, these output values may be readily combined via logic 814 to generate the $i^{th}$ chunky pixel. The nature of structure of the combining logic 814 will be readily apparent to those of ordinary skill in the art, e.g., assuming the input stream was encoded from left to right and top to bottom of a two-dimensional image, combining the planar pixel values at the outputs of the decoders at a given time into single (chunky) pixel depth map values in the same left-right-top-bottom order in which they were encoded/compressed.

Figure 10:
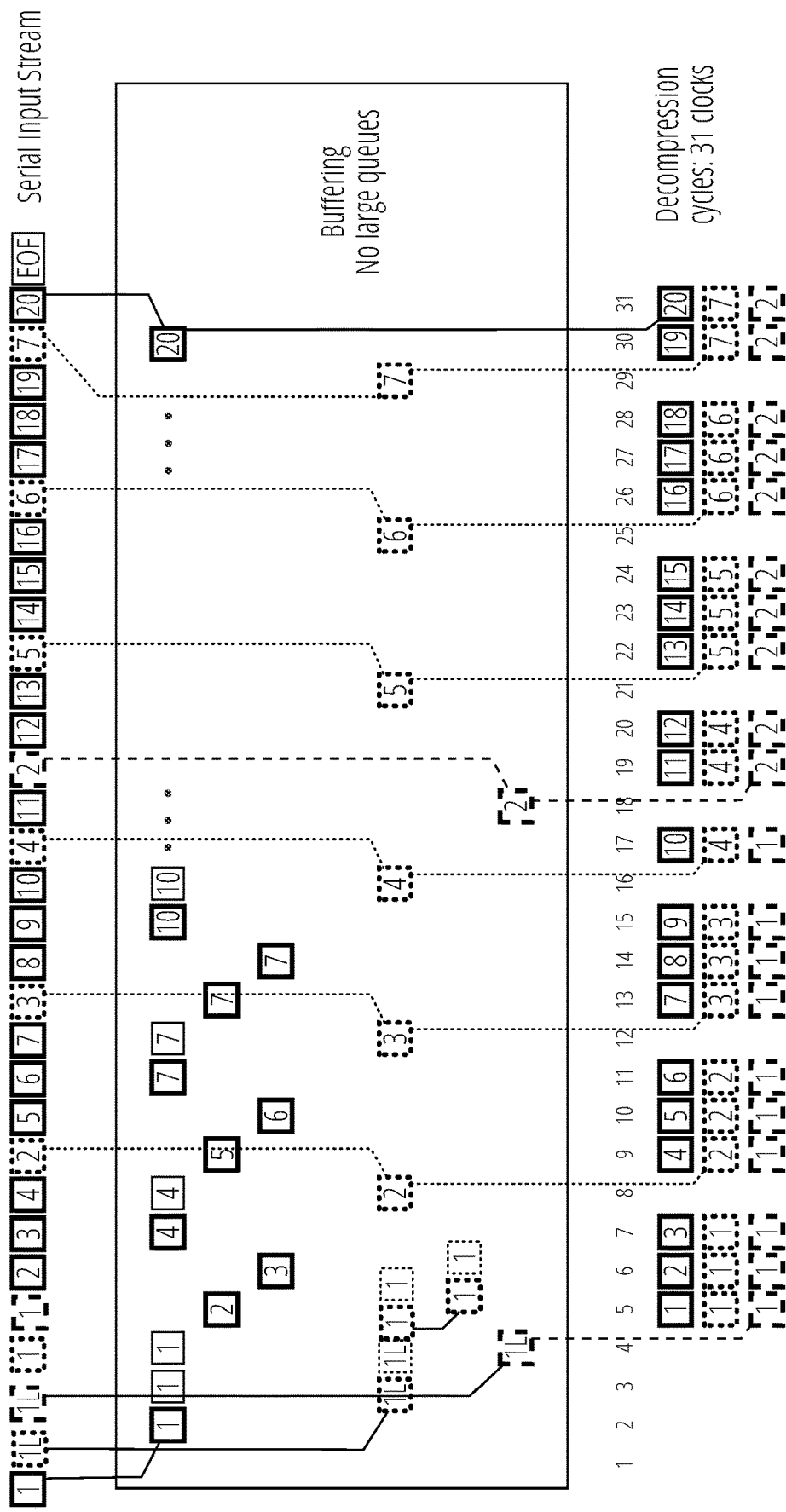
FIG. 10 depicts an example of CSRLE decompression of a three-plane stream.

FIG. 10 depicts an example of CSRLE decompression of a three-plane stream. The CSRLE decompressor requires very low buffering. There are no long bars in the figure, because all SRLE decoders receive the correct code at the proper time in the sequence. The individual decoders generate planar values for the chunky pixels in the order required to generate a continuous output stream of chunky pixels. The state transition logic and cursor position algorithms avoid deadlock, even with very low buffer memory allocation.

```
Code Listings

FIG. 6 Listing 1
    Initialization
        Q1CP            = 1
        Q2CP            = 1
        Q3CP            = 1
        InitLoop        = TRUE
FIG. 6 Listing 2
    If Q1Avail then
        SrleCode        = PopQ1( )
        RL              = OutputSrleCode(SrleCode)
        Q1CP            = (Srle1Eof( )) ? 9999 : Q1CP + RL
        goto nextState( )
    else stay S1
FIG. 6 Listing 3
    If Q2Avail then
        SrleCode        = PopQ2( )
        RL              = OutputSrleCode(SrleCode)
        Q2CP            = (Srle2Eof( )) ? 9999 : Q2CP + RL
        goto nextState( )
```

-continued

```
Code Listings else stay S2
FIG. 6 Listing 4
    If Q3Avail then
        SrleCode        = PopQ3( )
        RL              = OutputSrleCode(SrleCode)
        Q3CP            = (Srle3Eof( )) ? 9999 : Q3CP + RL
        InitLoop        = FALSE
        goto nextState( )
    else stay S3
FIG. 6 Listing 5
    function nextState( )
        if InitLoop    nextState = curState + 1
        elseif AllDone nextState = EOF
        else
            case (QCPmin)
                QCP1: nextState = S1
                QCP2: nextState = S2
                QCP3: nextState = S3
            endcase
        endif
        return nextState
    endfunction
FIG. 9 Listing 6
    Initialization
        Q1CP            = 1
        Q2CP            = 1
        Q3CP            = 1
FIG. 9 Listing 7
    If FifoAvail( ) then
        SrleCode        = PopFifo( )
        RL              = RouteToSrle1(SrleCode)
        Q1CP            = Q1CP + RL
        goto nextState( )
    else stay S1
FIG. 9 Listing 8
    If FifoAvail( ) then
        SrleCode        = PopFifo( )
        RL              = RouteToSrle2(SrleCode)
        Q2CP            = Q2CP + RL
        goto nextState( )
    else stay S2
FIG. 9 Listing 9
    If FifoAvail( ) then
        SrleCode        = PopFifo( )
        RL              = RouteToSrle3(SrleCode)
        Q3CP            = Q3CP + RL
        goto nextState( )
    else stay S3
FIG. 9 Listing 10
    function nextState( )
        if FifoEof( ) nextState = EOF
        else
            case (QCPmin)
                QCP1: nextState = S1
                QCP2: nextState = S2
                QCP3: nextState = S3
            endcase
        endif
        return nextState
    endfunction
Listing Notes
```

Dynamic Computations (Outside State Machine):

```
QCPmin              = min(Q1CP, Q2CP, Q3CP)
AllSrleIdle         = Srle1Idle & Srle2Idle & Srle3Idle
AllQueuesEmpty      = Q1Empty & Q2Empty & Q3Empty
AllDone             = AllSrleIdle & AllQueuesEmpty
``` goto nextState( )—Assigns curState the state returned by function nextState( ), and transitions to that state.

min( )—Returns the minimum value out of all arguments.

OutputSrleCode( )—Emits an SRLE code to the singular output stream and returns the count of pixels represented by that code.
SrlenEof( )—Returns TRUE if the given SRLE encoder has no more data.
1. SrlenIdle( )—Returns TRUE if the given SRLE encoder is idle.
FifoAvail( )—Returns TRUE if FIFO has data (not shown in FIG. 8).
FifoEof( )—Returns TRUE if the end of the serial input stream is reached.
PopFifo( )—Returns the next SRLE code from the singular streaming FIFO.
RouteToSrlen( )—Sends an SRLE code to a given SRLE decoder.

LISTING OF DRAWING ELEMENTS 100 printing system
102 image processing logic
104 PDL interpreter
106 JPEG decoder
108 JPEG encoded stream
110 deserialized stream
112 color conversion logic
114 color converted stream
116 CSRLE compressor
118 encoded stream
120 page store
122 render pipeline
124 printer
126 CSRLE decompressor
128 deserialized stream
130 render module
132 rendered stream
134 memory
202 CSRLE compressor
204a SRLE encoder 1
204b SRLE encoder 2
204c SRLE encoder 3
206 buffer
208a queue 1
208b queue 2
208c queue 3
210 serializer
212 chunky pixel input stream
214 code sequence
216a cursor
216b cursor
216c cursor
218a code stream
218b code stream
218c code stream
300 flow diagram
302 initialization
304 block
306 block
308 decision block
310 block
312 block
314 end block
316 decision block
318 block
320 decision block
322 decision block
324 block
326 block
328 decision block
330 block
332 decision block
334 decision block
336 decision block
338 block
340 block
342 block
344 decision block
346 block
348 block
802 CSRLE decompressor
804 deserializer
806a SRLE decoder 1
806b SRLE decoder 2
806c SRLE decoder 3
808a cursor
808b cursor
808c cursor
810 serial input stream
812a planar pixel output stream
812b planar pixel output stream
812c planar pixel output stream
814 logic Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A digital image encoder, comprising:
    a memory;
    a plurality of planar SRLE (Spilt Run-length Encoding) encoders;
    a plurality of queues formed in the memory, each of the queues associated with one of the planar SRLE encoders, each queue configured to input pixel values from a single plane of a multi-plane digital image;
    logic configured to:
        maintain a cursor position for each queue;
        increment the cursor position of a corresponding one of the queues each time a SRLE code is popped from a queue of the associated planar SRLE encoder, an amount of the increment being a count of planar pixel values represented by the SRLE code; and
        combine the SRLE codes from the queues into a serial stream in an order determined by the cursor positions.

2. The digital image encoder of claim 1, the logic further configured to:
    compare the cursor positions to determine a next queue to provide a next SRLE code to combine.

3. The digital image encoder of claim 2, the logic further configured to:
    select as the next queue a one of the queues with a lowest cursor position value.

4. The digital image encoder of claim 3, the logic further configured to:
    on condition of a tie for the next lowest cursor position value, select as the next queue a one of the queues with a next lowest queue number.

5. The digital image encoder of claim 1, the logic further configured to:
    assign a state to each queue;
    at each state, wait for at least one SRLE code to be popped from the associated queue to which the state is assigned;
    increment the cursor position for the associated queue by a run length associated with the SRLE code popped from the associated queue; and
    transition to a state for a queue different than the associated queue.

6. The digital image encoder of claim 1, the logic further configured to:
    skip over waiting at empty queues once the input pixel values are no longer being received.

7. The digital image encoder of claim 1, wherein depths of the queues are configured to accommodate a longest run length supported by the associated SRLE encoders.

8. A device for rendering compressed digital images, the device comprising:
    a deserializer;
    a plurality of planar SRLE decoders each configured to transform an applied code from a serial input stream into one or more planar pixel values;

the deserializer configured to:
maintain a cursor position for each of the planar SRLE decoders;
increment the cursor position of a corresponding one of the planar SRLE decoders each time a code is applied to the corresponding planar SRLE decoder, an amount of the increment being a count of planar pixel values represented by the applied code; and
logic to combine the planar pixel values from the SRLE decoders into a digital image rendering.

9. The device of claim 8, the deserializer further configured to:
compare the cursor positions to determine a next one of the planar SRLE encoders to which to apply a next code from the serial input stream.

10. The device of claim 9, the deserializer further configured to:
select as the next one of the planar SRLE encoders a one of the SRLE encoders with an associated lowest cursor position value.

11. The device of claim 10, the deserializer further configured to:
on condition of a tie for the next lowest cursor position value, select as the next one of the planar SRLE encoders a one of the planar SRLE encoders with a next lowest number.

12. The device of claim 8, the deserializer further configured to:
assign a state to each planar SRLE decoder;
at each state, wait for at least one SRLE code to be applied to the planar SRLE decoder to which the state is assigned;
increment the cursor position for the assigned planar SRLE decoder by a run length associated with the SRLE code applied into the assigned planar SRLE decoder; and
transition to a state for a planar SRLE decoder different than the assigned planar SRLE decoder.

13. The device of claim 8, the deserializer further configured to:
skip over waiting at idle planar SRLE decoders once the serial input stream is no longer being received.

14. A system for compressing, storing, and rendering digital images, the system comprising:
a plurality of planar SRLE encoders;
a plurality of queues, each of the queues associated with one of the planar SRLE encoders, each queue configured to input pixel values from a single plane of a multi-plane digital image;
a serializer configured to:
maintain a cursor position for each queue;
increment the cursor position of a corresponding one of the queues each time a SRLE code is dequeued by the associated planar SRLE encoder, an amount of the increment being a count of planar pixel values represented by the dequeued code; and
combine the SRLE codes from the queues into a serial encoded stream in an order determined by the cursor positions;
a machine memory to store the serial encoded stream;
a printer comprising:
a plurality of planar SRLE decoders each configured to transform an applied code from the serial encoded stream into one or more output planar pixel values;
a deserializer configured to:
maintain a cursor position for each of the planar SRLE decoders;
increment the cursor position of a corresponding one of the planar SRLE decoders each time a code from the serial encoded stream is applied to the corresponding planar SRLE decoder, an amount of the increment being a count of planar pixel values represented by the applied code; and
logic to combine the planar pixel values from the SRLE decoders into a digital image rendering.

15. The system of claim 14, the deserializer further configured to:
compare the cursor positions to determine a next queue to provide a next SRLE code to combine.

16. The system of claim 14, the deserializer further configured to:
compare the cursor positions to determine a next one of the planar SRLE encoders to which to apply a next code from the serial input stream.

17. The system of claim 16, the deserializer further configured to:
select as the next one of the planar SRLE encoders a one of the SRLE encoders with an associated lowest cursor position value.

18. The system of claim 17, the deserializer further configured to:
on condition of a tie for the next lowest cursor position value, select as the next one of the planar SRLE encoders a one of the planar SRLE encoders with a next lowest number.

19. The system of claim 14, the deserializer further configured to:
assign a state to each planar SRLE decoder;
at each state, wait for at least one SRLE code to be applied to the planar SRLE decoder to which the state is assigned;
increment the cursor position for the assigned planar SRLE decoder by a run length associated with the SRLE code applied into the assigned planar SRLE decoder; and
transition to a state for a planar SRLE decoder different than the assigned planar SRLE decoder.

20. The system of claim 14, the deserializer further configured to:
skip over waiting at idle planar SRLE decoders once the serial input stream is no longer being received.

* * * * *